Patented July 4, 1933

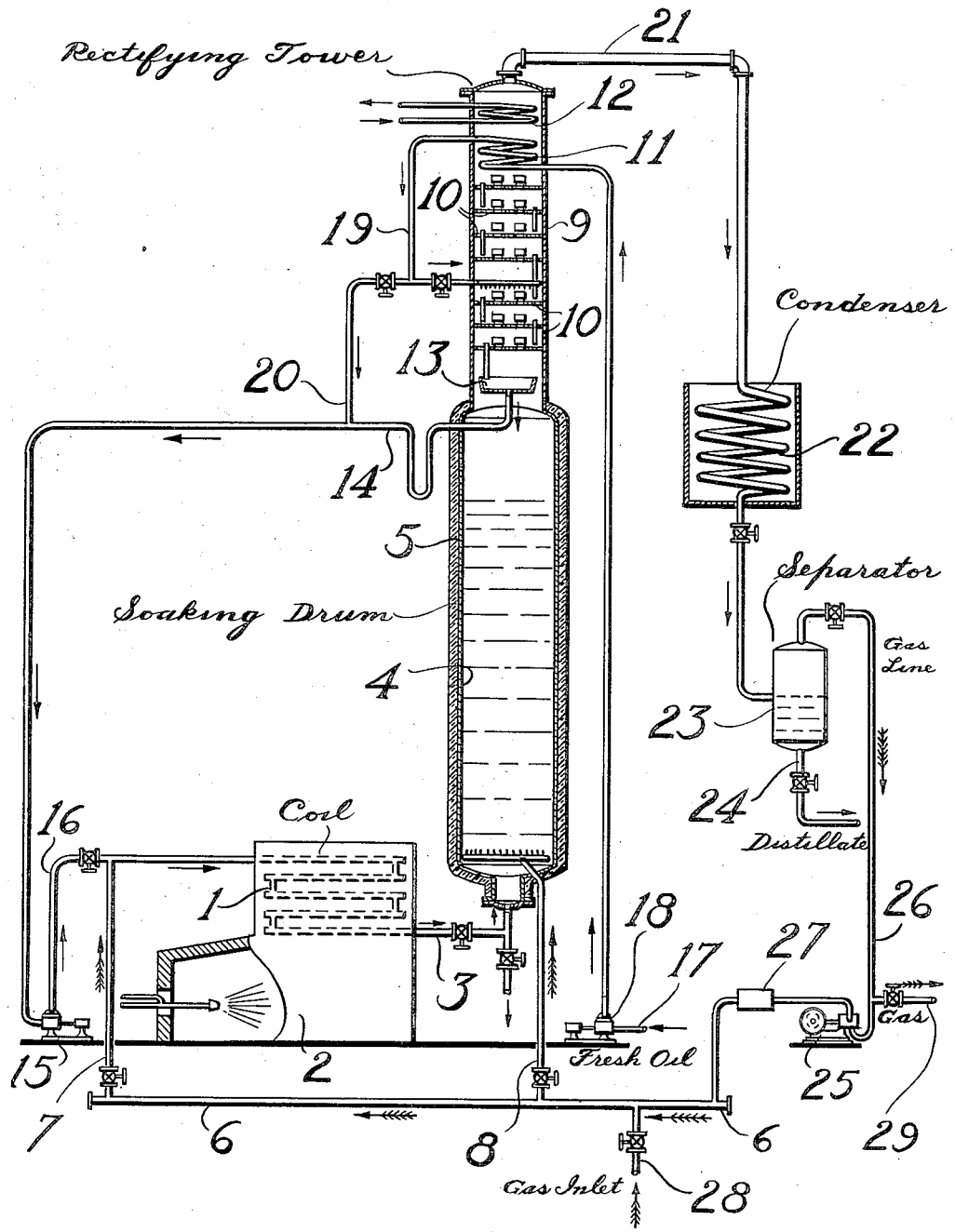

1,916,441

UNITED STATES PATENT OFFICE

ROBERT P. RUSSELL, OF BATON ROUGE, LOUISIANA, ASSIGNOR TO STANDARD-I. G. COMPANY

PROCESS FOR PRODUCING HYDROCARBON DISTILLATES

Application filed January 7, 1929. Serial No. 330,861.

The present invention relates to an improved process for obtaining valuable distillates from petroleum and the like by the action of heat and a gas rich in hydrogen under high pressure. My improved process will be fully understood from the following description and the drawing which illustrates my invention.

The drawing is a semi-diagrammatic view in sectional elevation of an apparatus constructed according to my invention and indicates the flow of oil and gas.

Referring to the drawing, reference character 1 denotes a pipe coil arranged in a furnace setting 2 and adapted to heat a stream of petroleum or the like to a decomposition temperature. Coil 1 discharges through pipe 3 preferably into the lower part of drum 4 which is adapted to withstand high pressure and high temperature as well as the corrosive effects of the reactants. The drum is preferably protected against excessive loss of heat by an insulating layer 5 and may be heated internally, if desired, but I prefer to maintain temperature merely by the addition of heat to the oil fed to drum 4. Any suitable means may be provided to agitate the oil in drum 4.

Hydrogen or a gas rich in free hydrogen is fed to the inlet of coil 1 from a manifold 6 and a branch pipe 7. Hydrogen may also pass directly into the drum by branch pipe 8.

A rectifying tower 9 is connected to the upper part of drum 4, either by directly mounting the tower on the drum, as shown in the drawing, or by means of a vapor passage which allows substantially no drop in pressure. The tower is fitted with bell cap plates 10 or equivalent fractionation devices and is fitted in its upper portion with cooling coils 11 and 12. A pan 13, or equivalent means, is placed in the lower part of the tower to catch reflux condensate which is removed by a trapped line 14 and conducted to the inlet of pump 15. The pump then forces the oil by line 16 to the inlet of coil 1. Fresh oil is withdrawn from storage (not shown) by line 17 and forced by pump 18 through coil 11 and into the tower 9 at about its middle portion by line 19 or directly into line 14 by pipe 20.

Vapor from the upper part of tower 9 flows by vapor line 21 to a condenser 22 which empties into a gas separating drum 23. Distillate is removed therefrom by line 24 to storage (not shown) and fixed gas is conducted to compressor 25 by line 26. The recompressed gas is then returned to manifold 6 for recirculation. Numeral 27 denotes a purification system, which may be any known method, for removal of hydrocarbons and hydrogen sulphide from the recirculated hydrogen. I prefer to scrub the gas with oil and with an aqueous alkaline solution, but other methods are permissible. Fresh, high pressure gas rich in free hydrogen is admitted by line 28 and a part of the used gas may be withdrawn by line 29, if desired.

In the practice of my invention, a body of oil which may contain solid carbonaceous matter, such as solid asphalt coal or the like, ground to a fine powder, is maintained at an elevated temperature within the range of thermal decomposition and preferably between about 750 and 970° F. The oil is subjected therein to the action of a gas rich in free hydrogen under an elevated pressure, for example above about 25 or 50 atmospheres, and preferably in the neighborhood of 200 atmospheres. Under such conditions the oil undergoes decomposition and hydrogenation with the production of large yields of light distillate.

Catalysts may be provided in the drum to promote the reactions and I prefer to use metal oxids such as chromium oxide, molybdenum oxid, or mixtures of the same, with each other or with other oxids preferably of the 6th or 8th groups of the periodic system. The catalyst is preferably suspended in the oil in the drum in a finely divided state.

Hydrogen or a gas rich in free hydrogen is forced into the oil body and vapors, which comprise light oils, heavier oils and fixed gases, are removed immediately from the drum to a dephlegmating column. Fixed gas and light oil are allowed to pass over head while the heavier oil is refluxed. The tower is preferably operated at substantially the same pressure as the drum 4 and temperatures at top and bottom are maintained at temperatures of about 400°–600° F. and about 600°–800° F., respectively, depending on the boiling range of the distillate desired, pressure and the volume of hydrogen containing gas forced into the drum, as will be understood. Temperature is maintained in the tower by artificial cooling, preferably by the fresh feed, which may be forced directly into the tower in contact with the vapor or indirectly through a cooling coil, or as shown in the drawing a combination of the two methods may be used. Additional cooling by coil 12 is generally required.

The reflux is drawn from the base of tower 9 and heated by passage through a coil before injection into the drum. It is preferable to pass hydrogen through the coil along with the oil.

Vapor from the tower is condensed preferably under full pressure and gas is separated from the distillate. Part of the gas may be recirculated but preferably after purification, such as for instance scrubbing with aqueous alkali to remove hydrogen sulphide and with oil to remove at least the major part of the methane and other hydrocarbons. Hydrogen circulated is much in excess of that actually entering in combination with the oil and the quantity may vary widely. Circulation of 10,000 to 15,000 cu. ft. per barrel of oil treated has been satisfactory.

My invention is not to be limited by any theory of the mechanism of the process nor by any example given merely for illustrative purposes and the advantages will be apparent to those skilled in the art. My invention is to be limited only by the following claims in which I wish to claim all novelty inherent in the invention.

I claim:

1. An improved process for obtaining valuable distillate from heavy carbonaceous matter, which comprises maintaining a body of such material at a decomposition temperature while under pressure in excess of 25 atmospheres, continuously passing a mixture of the said material and a gas rich in free hydrogen through a heating zone into said body, removing vapor therefrom, partially condensing the vapor under rectifying conditions at a pressure in excess of 25 atmospheres and separately condensing a part of the remaining vapor.

2. An improved process for obtaining valuable distillates from heavy carbonaceous material, comprising maintaining a body of such material at a decomposition temperature and under pressure in excess of 25 atmospheres, forcing a mixture of said material and a gas rich in free hydrogen through a heating zone into said body, withdrawing vapor therefrom, partially condensing the same under rectifying conditions while under full pressure, returning condensate so produced to the body of material and separately condensing a part of the remaining vapor.

3. An improved process for obtaining low boiling distillate from heavier hydrocarbon material which comprises maintaining a fluid body of the heavy material at a decomposition temperature, while under pressure in excess of 25 atmospheres, continuously forcing into said body of heavy material a heated mixture of the material and a gas rich in free hydrogen, continuously withdrawing vapors therefrom, partially condensing the same under rectification conditions at substantially full pressure, heating the partial condensate in admixture with hydrogen, forcing the heated mixture into the body of reacting material, and separately condensing a part of the residual vapors from the rectification zone.

4. Process according to claim 3 in which the partial condensation is effected by exchange of heat to fresh oil which is then forced into the body of oil.

5. Process according to claim 3 in which a part of the fresh oil is continuously forced into direct contact with the vapors undergoing partial condensation and rectification, said fresh oil and partial condensate are mixed with hydrogen, heated to a high temperature and forced into the body of oil.

6. An improved process for producing low boiling distillate from heavier petroleum hydrocarbons, comprising maintaining a body of such hydrocarbon at a temperature between approximate limits of 750 and 970° F. and under pressure in considerable excess of 25 atmospheres, continuously withdrawing vapors therefrom into a rectification zone maintained at substantially the same pressure, cooling said rectification zone by heat exchange with fresh oil to produce reflux condensate, admixing preheated fresh oil and reflux condensate with hydrogen, heating said mixture to a high temperature and passing it into the body of oil whereby the temperature of said body is maintained, withdrawing uncondensed vapor from the rectification zone and condensing low boiling, normally liquid hydrocarbons therefrom.

7. Process according to claim 6 in which the final condensation is under substantially full pressure and a part of the uncondensed gas is recompressed, heated with fresh oil and condensate, and returned to the body of oil.

8. Process for producing valuable distillate from carbonaceous material which comprises heating the material to a temperature above about 750° F., discharging it into a reaction zone maintained at a pressure in excess of 50 atmospheres, collecting vapors from the reacting material in a rectification zone so connected to the reaction zone that the same pressure exists in both zones, passing fresh carbonaceous material through a coil in the upper portion of the rectification zone and discharging it into the vapors in the lower portion thereof, withdrawing reflux condensate from the rectification zone without releasing pressure, recirculating it through the heating operation to the reaction zone, and separately condensing vapors removed from the rectification zone.

ROBERT P. RUSSELL.